April 3, 1956 — C. C. GROTNES — 2,740,450
COMBINED FLANGING AND BEADING MACHINE FOR METALLIC DRUMS
Filed May 19, 1951 — 5 Sheets-Sheet 1
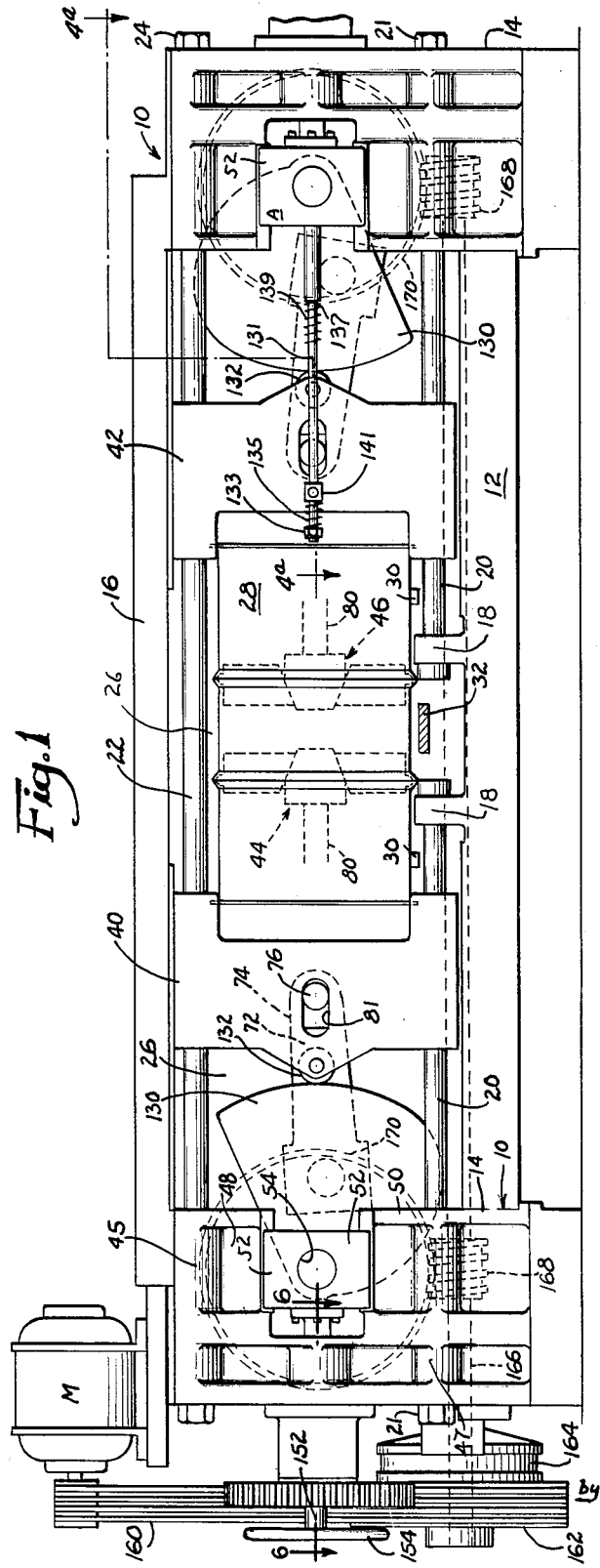
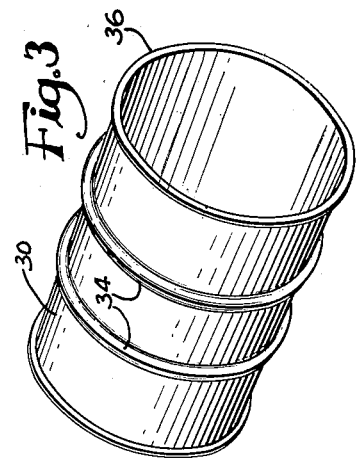
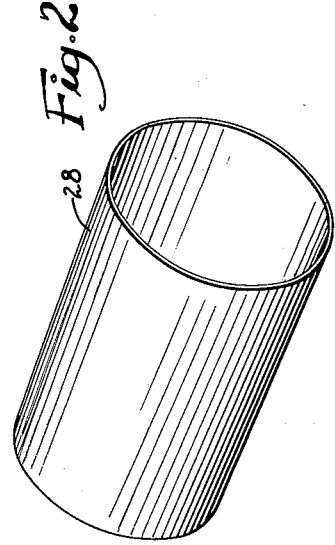
Inventor
Carl C. Grotnes

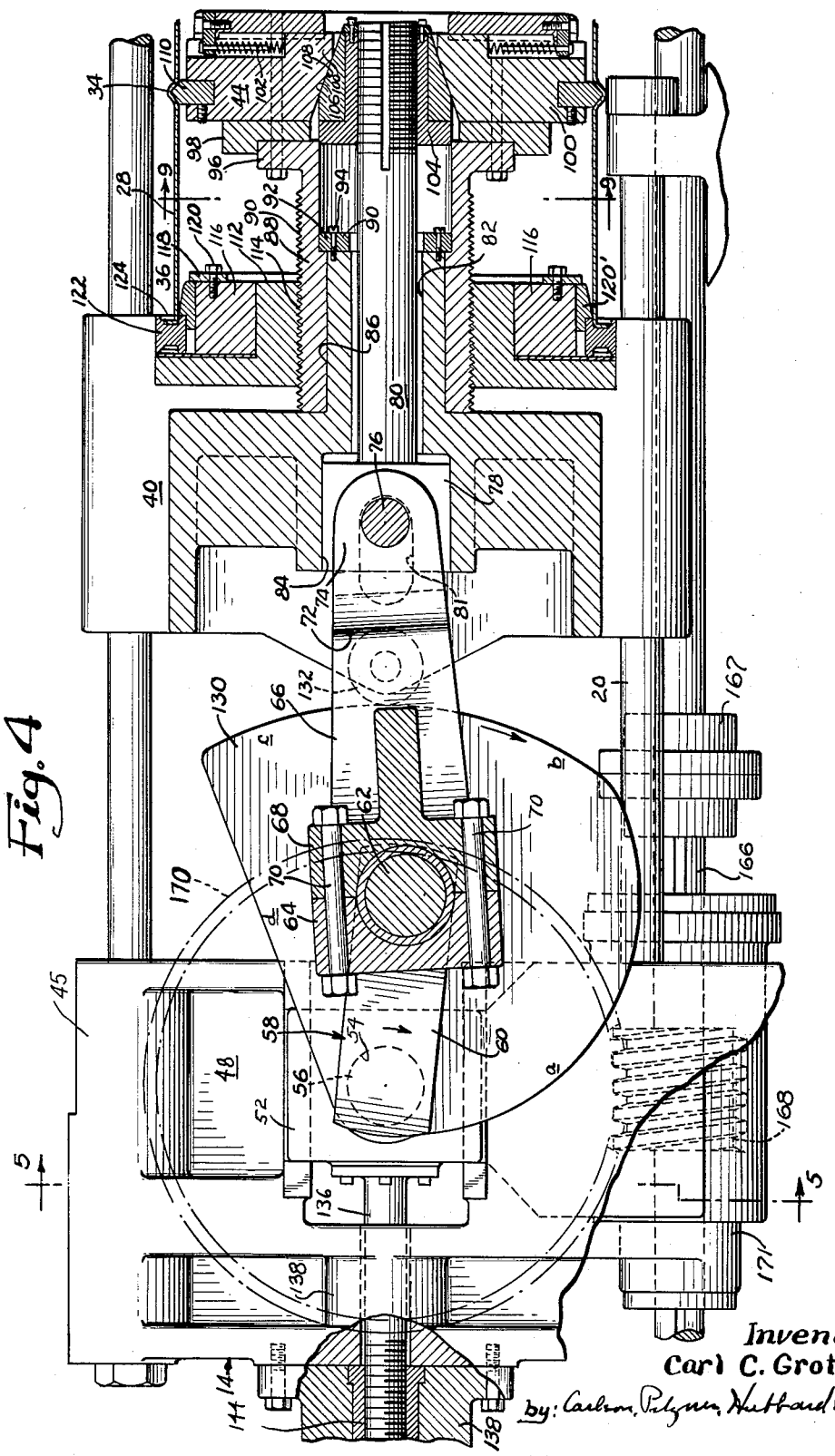

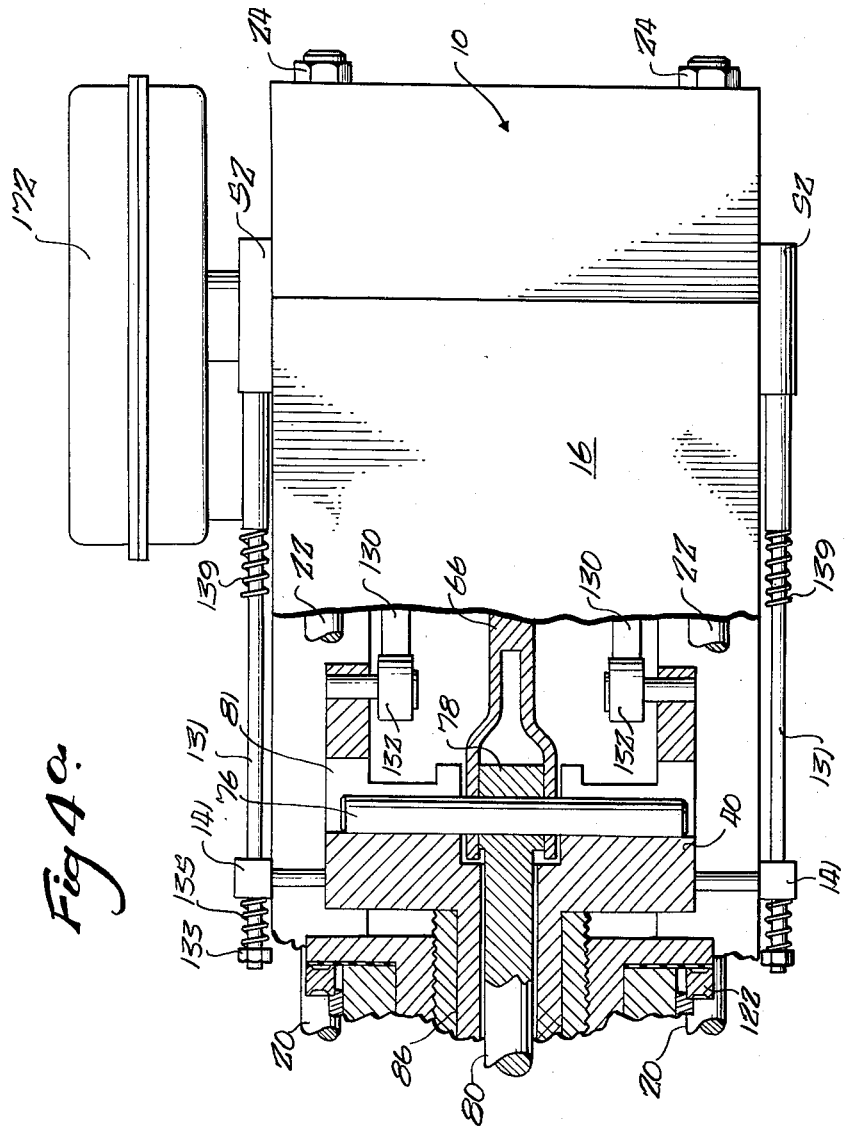

Inventor
Carl C. Grotnes

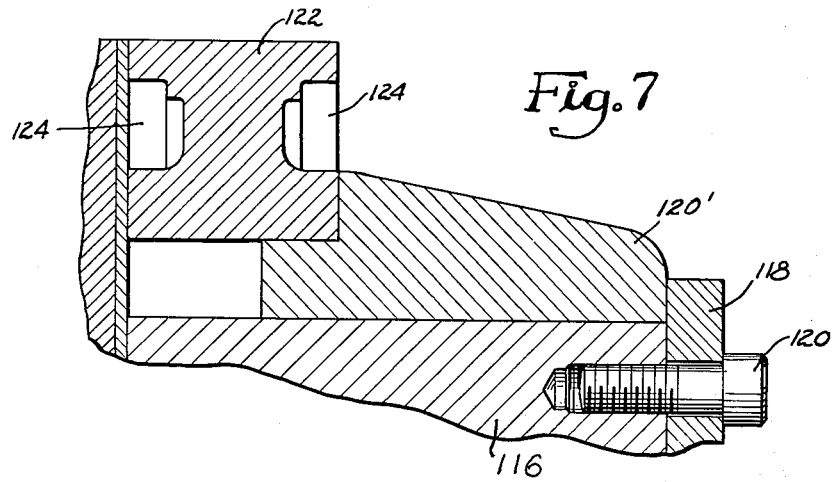
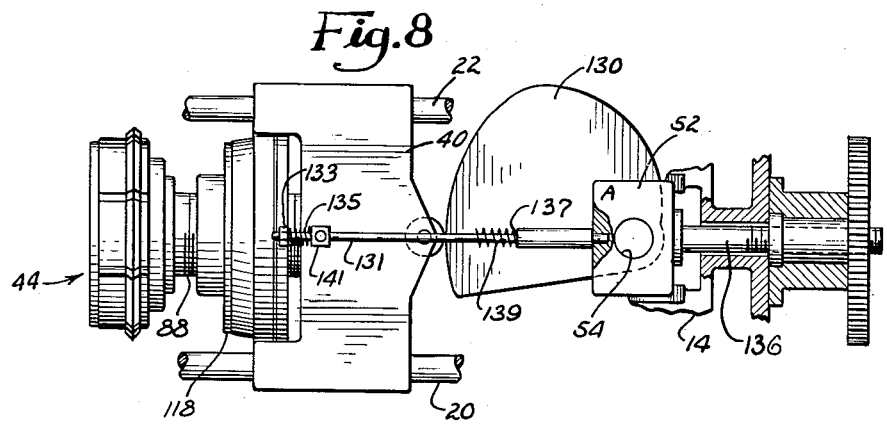
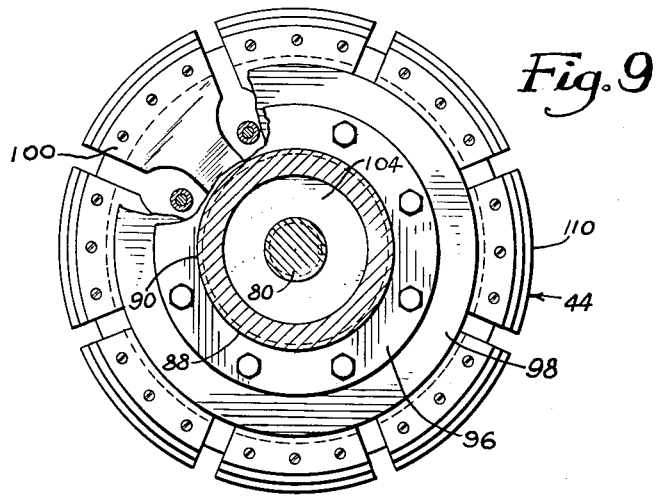

United States Patent Office 2,740,450
Patented Apr. 3, 1956

2,740,450

COMBINED FLANGING AND BEADING MACHINE FOR METALLIC DRUMS

Carl C. Grotnes, Park Ridge, Ill., assignor to Grotnes Machine Works, Inc., Chicago, Ill., a corporation of Illinois Application May 19, 1951, Serial No. 227,171

8 Claims. (Cl. 153—3)

The present invention relates to a combined flanging and beading machine for forming parallel, circumferentially extending beads on opposite sides of the transverse medial plane of a cylindrical shell of the type used in the manufacture of metal drums or barrels, while at the same time forming circumferential flanges at the opposite ends thereof. The invention is designed as an improvement over the apparatus shown and described in my prior Patent No. 2,089,475 dated August 10, 1937, for Machine for Forming Beads in Metallic Drums.

Whereas in my prior patent the machine illustrated is designed solely for the purpose of forming parallel circumferentially extending beads in a metallic drum shell, the present machine performs the additional operation of pre-flanging or edging the opposite ends of the shell by producing therein laterally extending flanges designed for subsequent seaming cooperation with the peripheral edge of a pair of drum heads.

The present invention also constitutes an improvement over my prior machine as illustrated in the above mentioned patent in that the beading operation may be performed more effectively, rapidly, and at a lower cost than has heretofore been possible.

The provision of a machine of the type briefly outlined above being the principal object of the invention, another and important object is to provide a machine of this character having associated therewith improved means for compensating for the stretching of the metal lengthwise of the shell incident to the bead forming operation. A similar and related object is to provide a means whereby such compensation for stretching is equalized on opposite sides of each of the formed beads so that the metal of the drum going into or forming each bead is drawn from those portions of the shell existing on opposite sides of the bead.

A still further object of the invention is to provide a bead forming machine of this type which will operate upon successive barrels to simultaneously form the end flanges in the shell and to thereafter simultaneously perform the two beading operations.

A further object of the invention is to provide a beading machine of the character shown and described in my above mentioned patent having associated therewith a pair of floating beading heads, which, during the actual beading operation, automatically follow any longitudinal shifting movement of the beads undergoing formation so as to permit equalization of metal flow into the bead thereby producing a bead which is uniform in its characteristics.

Machines of the type shown and described in my above identified patent are predicated upon the use of a pair of axially shiftable bead forming heads which move in unison inwardly of the cylindrical shell and which, when they attain predetermined respective beading positions, are prevented from further inward movement by positive stops provided on the machine framework. The actuating mechanism for moving the heads consists of a pair of cranks which operate through connecting rods not only to cause inward movement of the heads but also, after the heads have been so limited in their movement, operate to advance the connecting rod a further distance to expand the bead forming dies associated with each head. A further object of the invention is to provide an improved mechanism of this character wherein the cylindrical shell undergoing formation itself constitutes the means for limiting the inward movements of the heads so that further movements of the die operating rods will expand the forming dies. In this manner, not only will small discrepancies in the length of the individual shells undergoing formation be automatically compensated for, but additionally the possibility of damage to the machine is obviated.

Another object of the invention is to provide a combined flanging and bead forming machine for cylindrical barrel drums in which the flanging dies are adjustable in opposite directions longitudinally of the machine to accommodate the flanging and subsequent beading of drum shells of different lengths.

Another object of the invention is to provide a machine of this character in which the positions of the beading dies may be adjusted longitudinally of the machine to cause the formation of spaced circumferential beads in cylindrical shells at various predetermined locations along the length or extent of the shell and with predetermined spacing between beads.

Another object of the invention is to provide a machine having reversible flanging dies provided with flanging surfaces either of similar configuration or of different configurations so that, in the former instance, the useful life of each die considered as a unit may be substantially doubled, or in the second instance, the character of the flange applied to the barrels may be modified without requiring substitution of dies.

The provision of a machine of this character which is extremely rugged and durable; one which is comprised of a minimum number of moving parts and which consequently is unlikely to get out of order; one which may be manufactured at a relatively low cost; and one which is otherwise well-adapted to perform the services required of it are further desirable features that have been borne in mind in the production and development of the present invention.

In the accompanynig four sheets of drawings forming a part of this specification:

Figure 1 is a side elevational view of an improved flanging and beading machine constructed in accordance with the principles of the present invention.

Fig. 2 is a perspective view of a shell blank prior to its introduction into the machine.

Fig. 3 is a perspective view of a flanged and beaded shell after it has emerged from the machine.

Fig. 4 is an enlarged fragmentary side elevational view, partly in section, of a portion of the machine shown in Fig. 1.

Fig. 4a is a fragmentary, partly sectioned view of the machine taken in offset planes substantially on the line 4a—4a of Figure 1.

Fig. 7 is a fragmentary sectional view taken through a portion of one of the reversible dies employed in connection with the present invention.

Fig. 8 is a fragmentary side elevational view, partly in section, of a portion of the machine adjacent one end thereof with certain parts removed to more clearly illustrate the nature of the invention.

Fig. 9 is a sectional view taken substantially along the line 9—9 of Fig. 4.

In all the above described views similar characters of reference are employed to designate similar parts throughout.

Figure 5:
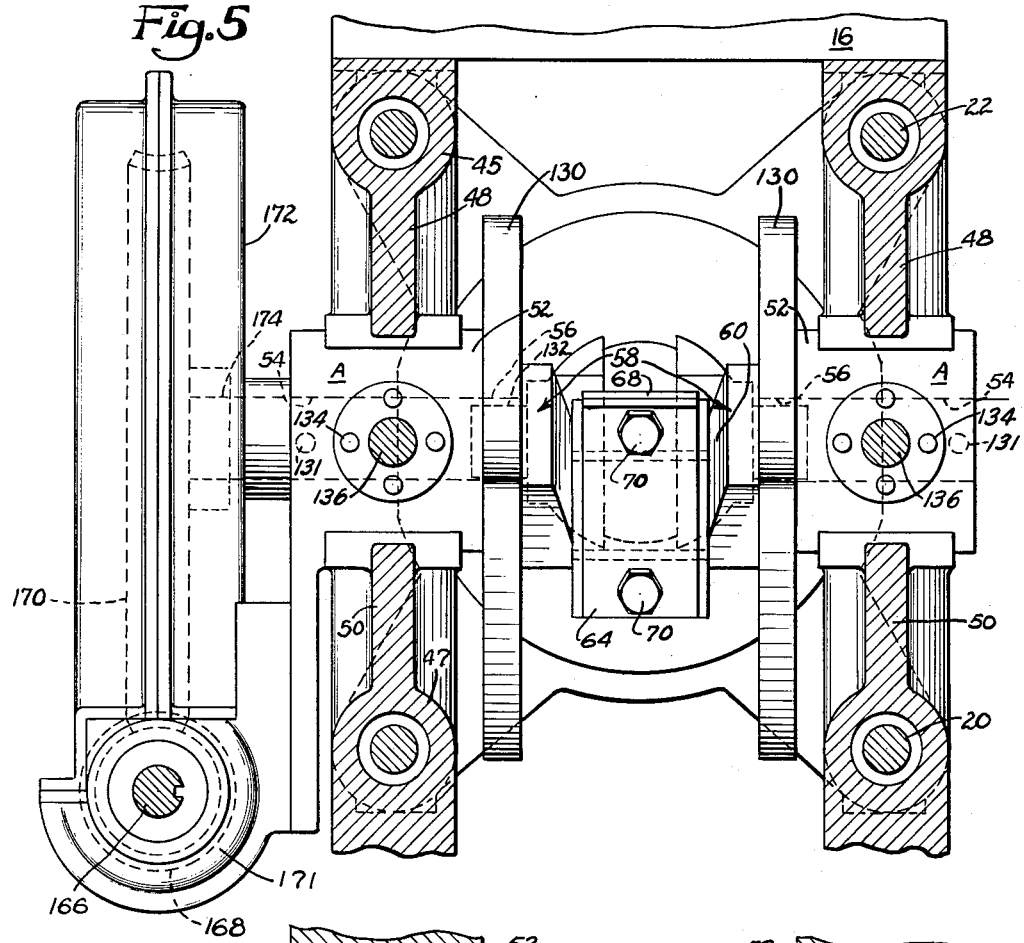
Fig. 5 is a sectional view taken in off-set vertical planes substantially along the line 5—5 of Fig. 4.

While the invention is susceptible of various modifications and alternative constructions, there is shown in the drawings and will herein be described in detail the preferred embodiments, but it is to be understood that it is not thereby intended to limit the invention to the forms disclosed, but it is intended to cover all modifications and alternative constructions falling within the spirit and scope of the invention as expressed in the appended claims.

In the form of the invention illustrated, two inner expanding die assemblies or beading heads are employed. These assemblies are moved simultaneously from initial retracted positions in opposed spaced relationship into operative advanced positions within the opposite ends of a metallic drum shell while at the same time a pair of flanging dies mounted on reciprocable flanging heads are brought into engagement with the ends of the drum and advanced upon the shell in such a manner as to initially form the end flanges on the shell. Thereafter the beading dies are simultaneously expanded so as to press the metal of the shell outwardly at regions spaced inwardly from the ends of the drum to form the two annular beads in the shell. The bead forming operation on the two beads is carried out simultaneously and the beading heads which include the beading dies are allowed to float freely, so to speak, according to the resistance of the metal of the shell on opposite sides of each bead so that an excess of metal is not drawn from one side of a bead while starvation of metal occurs on the other side of the bead. Because of this floating action of the die carrying beading heads, the beading operations may be carried out simultaneously instead of successively as heretofore practiced in connection with the beading machine shown in my above mentioned patent. After the beads are formed, the dies are retracted and the beading heads are withdrawn together with the flanging heads and their associated flanging dies to permit the flanged and beaded article to be removed and a succeeding article substituted in its place. The "throw" or, in other words, the extent of inward movement of the beading die head structures may be varied in order to increase or decrease the distance between the beads that are formed in the shell. Additionally, the positions of the flanging dies on the reciprocable supporting carriages may be varied to accommodate the flanging of shells of different length.

Referring now to the drawings in detail and in particular to Figure 1, the machine as constructed for the purpose of carrying out the present invention involves in its general organization a stationary framework 10 including a medial base portion 12 which is of generally elongated rectilinear design and a pair of closely fitting end castings 14 which project upwardly beyond the base portion 12 and serve to support therebetween an upper shelf portion 16 which bridges the distance therebetween. The base portion 12 is provided with a plurality of upstanding lugs or ears 18 arranged in pairs on opposite sides of the medial transverse plane of the machine and each ear serves to support therein the inner end of a headed guide rod 20 which passes through one of the end castings 14 and receives thereon a clamping nut 21. Each guide rod 20 thus serves in part to clamp the end castings 14 to the base casting 12 in assembled relationship. A pair of upper longitudinally extending guide rods 22 (see also Figs. 4 and 5) project through the end castings 14 and carry at their ends clamping nuts 24. The guide rods 22 thus serve to clamp the upper regions of the castings 14 to the shelf portion 16.

The base portion 12, castings 14 and shelf portion 16 define a generally rectilinear structure having an open space 26 adapted to receive in the central regions thereof, at a loading and discharge station, a seamless cylindrical shell such as is shown at 28 in Fig. 2. The shell 28 may be deposited upon a retractible receiving cradle, a portion of which is shown at 30. An ejecting cradle, a portion of which is shown at 32, may be provided for removing the formed shell or drum from the machine.

One of the formed shells or drums is illustrated in Fig. 3 and is provided with a pair of spaced deep-formed circumferential ribs or beads 34 in the medial regions thereof on the opposite sides of a transverse medial plane and with end flanges 36 designed for seaming engagement with a suitable enclosure or drum head (not shown). The nature of the receiving and discharge cradles 30, 32 forms no part of the present invention and reference may be had to my above mentioned patent for full disclosure of the nature and operation of these cradles. It is deemed sufficient for purposes of disclosure herein to state that the two cradles are retractible and that suitable mechanism may be provided for bringing the receiving cradle 30 into position to receive one of the shells 28 thereon and thereafter retracting the same. Similarly, suitable mechanism may be provided for causing the ejecting cradle 32 to become elevated to engage the completed drum and remove the same from the receiving and discharge station.

The lower guide rods 20 and the upper guide rods 22 provide horizontal ways on which a pair of reciprocable flanging heads 40 and 42 (Figs. 1 and 4) may slide into and out of operative positions with respect to the cylindrical shell 28. The reciprocable flanging heads 40 and 42 serve as supporting and guide members for a pair of beading heads 44 and 46 respectively, all in a manner that will be made clear presently.

The construction of the two flanging heads 40 and 42 and their respective associated beading heads 44 and 46 are substantially identical in design and function and therefore it is thought that a description of the flanging head 40 and its cooperating beading head 44 and the relationship each bears to the other will suffice for the other pair of cooperating flanging and beading heads 42 and 46 respectively.

Referring now to Figs. 1 and 5, each of the end castings 14 includes upper and lower boss-like portions 45 and 47, respectively, through which the guide rods 22 and 20, respectively, pass and a pair of ribs 48 projects downwardly in spaced parallelism from the boss-like portions 45 while a similar pair of ribs 50 projects upwardly from the boss-like portions 47. The ribs 48 and 50 define therebetween horizontal ways for slidingly mounting a pair of journal blocks 52 of identical design and construction. The blocks 52 are provided with alined central transverse bores 54 therein adapted to receive the opposite ends 56 of a crankshaft 58 having associated therewith crank arms 60 (see also Fig. 4) and an offset throw section 62 which extends across the free ends of the crank arms 60. A connecting rod assembly including a cap bearing 64 and a connecting rod proper 66 having a bearing portion 68 cooperating with the cap bearing 64 and secured thereto by means of bolts 70 is secured to the throw section 62. The forward end of the connecting rod 66 is bifurcated as at 72, and the furcations 74 thus provided carry therebetween a cross pin 76 to which there is pivotally connected an enlarged head 78 provided on a die actuating plunger 80 and dimensioned to fit between the furcations 74. The cross pin 76 projects at its opposite ends into a pair of clearance slots 81 formed on opposite sides of the flanging head casting. The plunger 80 extends through a bore 82 provided in the casting of the flanging head 40 and the enlarged head 78 is slidably disposed within a counterbore 84 communicating with the bore 82, the counterbore being large enough to afford clearance for the furcations 74. The head casting is formed with a cylindrical extension 86 on which there is mounted a sleeve member 88 having an externally threaded surface 90 and which is secured in position thereon by means of an anchoring ring 92 and screws 94. The forward end of the sleeve 88 is flanged as at 96 and provides a support for a cage-like structure 98 forming a part of the beading head 44. A series of radially slidable die blocks 100 are mounted within the cage structure 98 and are normally held in inner retracted positions by means of springs 102. The forward end of the plunger 80 has adjustably mounted thereon a plunger head 104 having cam surfaces 106 thereon cooperating with cam surfaces 108 on the various die blocks 100 so that axial movement of the plunger 80 and the plunger head 104 to the right, as viewed in Fig. 4, will move the die blocks 100 radially outwardly against the action of the springs 102. Each die block 100 carries a die element 110 designed for engagement with the inner surface of the shell 28 for the purpose of forming the bead 34 therein when the die elements 110 are expanded in the manner described under the influence of the plunger 80 and plunger head 104.

Still referring to Figs. 1, 4 and 5, and particularly to Fig. 4, the flanging instrumentalities for forming the flange 36 at the end of the shell 28 includes a ring member 112 which is internally threaded as at 114 for threaded reception on the threads 90 of the cylindrical portion 88 of the head casting 40. A spacing collar 116 tightly fitted on the ring member 112 and having an anchoring ring 118 secured thereto by screws 120 provides a mounting for an annular retainer 120' which holds a reversible flanging die 122 of ring-like design and having flanging recesses 124 formed in the opposite sides thereof. The forward flanging recess 124 is designed for cooperating engagement with the rim of the shell 28 for forming the flange 36 thereon when the head 40 is moved to its fully advanced position on the guide rods 20 and 22. The rear flanging recess 124 is inactive in the position of the die 122 shown but is available for use upon reversal of the die.

Reciprocation of the head 40 is effected by means of a pair of cams 130 (Figs. 4 and 5) carried on the crankshaft 58 and rotatable about the axis of rotation of the latter. A pair of cam followers in the form of rollers 132 are mounted on the casting of the flanging head 40 and protrude rearwardly from the casting into the orbital paths of the cams 130 and receive the thrust of the cam during a portion of each cyclic movement or revolution of the latter. The cams 130 are provided with peripheral cam surfaces which are formed with a relatively sharp rise portion labelled a which merges with a gradual rise portion b which, in turn, merges with a dwell portion c. The cam contours are completed by a relatively sharp drop-off portion d. With the rollers 132 on the beginning of the rise portion a, the head 40 is fully retracted. At the commencement of each cycle of operations, as the cams 130 commence their cyclic one-revolution operation, the head 40 is advanced toward its extreme flanging position fairly rapidly but as it approaches the flanging position and the die element 122 comes into contact with the end of the shell 28, the movement is more gradual so that the flange 36 is not drawn too abruptly. After the flange 36 has been formed, the beading operation takes place while the rollers 132 are in register but not necessarily in contact with the dwell portion c of the cam surfaces. After the beading operation is complete, the head is free to become rapidly retracted under the influence of the cross pin 76 acting on the left hand end of the slots 81 as viewed in Fig. 4.

In order to limit the movements of the head 40 in opposite directions, a rod 131 is supported at one end from the block 52 and projects longitudinally inwardly of the machine as shown in Fig. 8. A stop nut 133 and spring 135 at one end of the rod and a stop shoulder 137 and spring 139 adjacent the other end of the rod cooperate with a keeper 141 carried by the head and slidable on the rod 131. The springs and stop elements also serve the additional function of equalizing the radial thrust of the two sets of flanging dies in order to eliminate any tendency for one of these sets of dies to exert a greater beading action on the shell than the other or, in other words, to prevent over-beading by one set of dies and under-beading by the other. The equalizing action of the springs 135 and 139 will be described subsequently.

A full description of the operation of the cam 130 in advancing the head 40 to perform the flanging operation and of advancing the plunger 80 to perform the beading operation, each in timed relationship with respect to the other, will be given subsequently after a description of the driving mechanism for these elements has been set forth.

Figure 6:
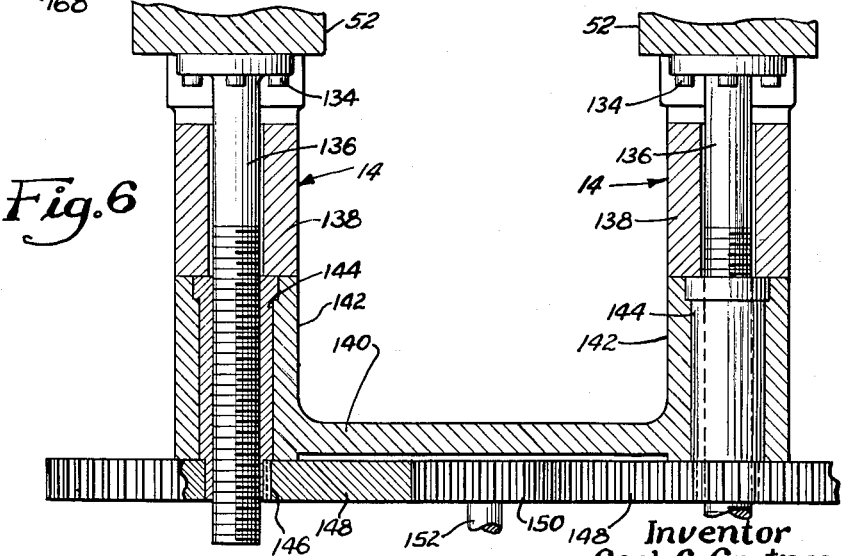
Fig. 6 is a sectional view taken substantially along the line 6—6 of Fig. 1.

Referring now to Figs. 1, 4 and 6, means are provided for manually adjusting the position of the crankshaft supporting block 52 along the ways provided for it by virtue of the ribs 48 and 50 in order to adjust the range of "throw" of the cam 130 and of the plunger 80 and consequently to vary the distance between the formed circumferential beads 34 in the shell 28. Toward this end each of the blocks 52 has secured to the rear face thereof by means of screws 134 (Fig. 6) the flanged end of a threaded adjusting rod 136 which passes through a sleeve portion 138 forming a part of the end casting 14. The rod associated with one block is formed with left-hand threads while the other rod is formed with right-hand threads for reasons that will be apparent as the description proceeds. An end piece 140 (Fig. 6) secured in position on the casting 14 is provided with a pair of boss portions 142 having sleeves 144 disposed therein through which the threaded portion of the adjusting rods 136 extends in threaded relationship with respect thereto. Each sleeve 144 has mounted thereon and keyed thereto as at 146 a relatively large gear 148 and the two gears 148 mesh with a common driving gear 150 carried on an operating shaft 152 on which there is disposed a hand wheel 154 at the extreme end of the machine. It will be seen therefore that as the operating shaft 152 is turned in one direction or the other by means of the hand wheel 154, the gears 148 will be rotated in opposite directions and the sleeves 144, operating upon the adjusting rods 136, will serve to move the latter in unison forwardly or rearwardly as the case may be to shift the positions of the crankshaft supporting blocks 52 to thus adjust the center of throw of both the cams 130 and the crank which imparts movement to the beading die operating plunger 80.

Referring now to Figs. 1 and 4, all of the operative moving parts of the machine are adapted to be driven from an electric motor M which is suitably mounted upon the shelf portion 16 of the machine at one end thereof. The motor M is connected through a driving belt 160 to a main driving pulley 162 which is connected through a clutch mechanism 164 to a drive shaft 166 (Figs. 4 and 5) which extends longitudinally along one side of the machine. The shaft 166 carries a worm 168 thereon which meshes with a gear 170 mounted upon an extension 174 of the crankshaft 58. A bracket 171 rigidly mounted on a depending portion of one of the journal blocks 52 as shown in Fig. 5 supports the shaft 166 and defines the lower part of a housing 172 enclosing the worm 168 and the gear 170 for driving the crank shaft at the corresponding end of the machine. The worm 168, of course, is drivingly connected with the shaft 166 by a feather key so that it can slide axially of the shaft when the journal block 52 is shifted forwardly or rearwardly to adjust the throw of the crank. To facilitate assembly and disassembly, the shaft 166 is formed in two sections connected by a conventional coupling 167. It will be understood, of course, that the machine is cyclic in its operation and suitable means (not shown) may be provided for actuating the clutch 164 in timed relation to the arrival of the shells 28 at the receiving station in order that the crankshaft 58 may be driven throughout one complete revolution during each machine cycle and the consequent formation of the shell 28.

In the operation of the apparatus the preformed cylindrical shells 28 are delivered to the receiving and discharge station successively and upon the arrival of each shell in position at the receiving station a cycle of machine operations is initiated by means of control mechanism which forms no part of the present invention. As soon as the clutch 164 becomes engaged after the arrival of a shell at the receiving station, the drive shaft 166 commences to rotate thus driving the two crankshafts 58 at the right and left ends of the machine, as viewed in Fig. 1, in a clockwise direction. As soon as the cam follower rollers 132 encounter the sector $a$ of the various cams 130, the flanging heads 40 and 42 commence to move rapidly inwardly toward each other and when these rollers move onto the sectors $b$ of the cam 130 a more gradual inward movement of the flanging heads takes place and during this time the flanging dies 122 engage the opposite ends of the cylindrical drum 28 and form the flanges 36 thereon.

The throw of the cams 130 determines the limit of inward movement of the heads 40 and 42 which, by virtue of the slots 81 therein are free to float in one direction or the other during actual forming operations.

During rotation of the crankshaft 58 as just described, the crank arms 60 swing inwardly of the machine thus advancing the plunger 80 associated with the beading die assemblies 44 and 46 so that by virtue of the camming action between the cam surfaces 106 and 108 the die blocks 100 are thrust radially outwardly thus bringing the die elements 110 into engagement with the inner surface of the shell 28 to form the spaced circumferential beads 34 in the shell at spaced regions therealong.

During the bead forming operation just described, the flanging heads 40 and 42 are free to follow any tendency of the die elements 110 to shift laterally by virtue of any internal stresses which may be generated in the shell by the metal of the shell 28. Normally it has been found that there is a tendency for longitudinal shifting of the die elements 110 inwardly of the machine accompanised by a slight shortening of the overall barrel length as some of the metal is drawn from the end regions of the drum.

At this point in the operation of forming the beads, the rollers or followers 132 may actually leave the surfaces of the cams 130 and the keeper 141 on the head 42 may engage the spring 135 and the forward or inward travel of the head 42 may be thus, to some measure, equalized with the travel of the companion head, particularly if there is a tendency for one set of beading dies to over-bead at the expense of the other set. In such an instance, the action of the spring 135 on the returning set of dies would normally exert a retarding influence on the head 40 associated therewith while the other head 42 would receive no such retarding influence. Consequently the retarded head would have a tendency to advance against the flanged end of the barrel and enhance the beading action of the trailing set of dies.

During the beading operation when the cam followers are either in contact or register with the dwell portions $c$ of the cams 130, the plungers 80 pass through their position of full throw and any floating action of the beading die assemblies 44 and 46 such as has been previously described will be made possible by the provision of the slots 81 in the head castings 40 and 42 which accommodates shifting movement of the cross pins 76.

Retraction or return of the heads 40 and 42 to their initial positions is effected as soon as the cross pins 76 engage the ends of the slots 81 in the head castings at which time the simple harmonic motion of the heads rapidly increases and the heads are quickly withdrawn as soon as the beading dies 110 have cleared the formed beads. After the heads 40 and 42 and plungers 80 are retracted, the clutch 164 is disengaged and the completed and formed shells may be removed from the receiving and discharge station under the influence of the discharge cradle 32 preparatory to reception of an oncoming shell 28.

I claim as my invention:

1. In a machine for simultaneously flanging the opposite open ends of cylindrical metal shells and forming spaced parallel cylindrical beads in the medial regions thereof, a bed, a shell-supporting cradle on said bed, a pair of heads slidably supported on said bed on each side of said cradle and capable of being advanced from retracted positions toward the cradle in unison, a flanging die carried by each head and movable with the latter into engagement with the adjacent end of a shell positioned on the cradle, a bead expanding die assembly mounted on each head and movable with the latter into the adjacent ends of the shell, each die assembly including a plurality of radially movable dies movable into bead expanding positions in unison, a die actuating plunger slidably disposed in each head and movable relative to the head from a retracted, inoperative position to an advanced, die expanding position, and cam and crank means respectively operative for advancing said heads and plungers in unison, said flanging dies initially engaging the ends of the shell to form flanges thereon, the continued advance of the plungers by said crank means after formation of said flanges serving to actuate said die assemblies in unison and effect the beading operation while said shell restricts the heads to such advances as are necessary to equalize the flow of metal into the beads being formed.

2. In a machine for simultaneously flanging the opposite open ends of cylindrical sheet metal shells and forming spaced parallel cylindrical beads in the medial regions thereof, a bed, a shell-supporting cradle on said bed, a pair of heads slidably supported on said bed on each side of said cradle and capable of being advanced from retracted positions toward the cradle in unison, a flanging die carried by each head and movable with the latter into engagement with the adjacent end of a shell positioned on the cradle, a bead expanding die assembly mounted on each head and movable with the latter into the adjacent ends of the shell, each die assembly including a plurality of radially movable dies movable into bead expanding positions in unison, a die actuating plunger slidably disposed in each head and movable relative to the head from a retracted, inoperative position to an advanced, die expanding position, a rotary cam positioned adjacent each head near the side thereof remote from said cradle and designed for contact with the head to effect advancing movements thereof, shafts journaled on said bed and supporting said cams, a crank arm on each shaft, a connecting rod connecting each crank arm and one of said plungers, and means for rotating said shafts together with said crank arms and cams about their respective common axes in unison to advance said heads and plungers simultaneously, said cams being operative to advance the heads a distance effective to form flanges on opposite ends of said shell, said crank arms and connecting rods continuing the advance of the plungers to actuate said bead expanding dies and effect simultaneous beading operations, and said shell acting in such continued advance of the plungers to restrict the heads to movements only sufficient to compensate for the flow of metal into the beads being formed.

3. In a machine for simultaneously flanging the opposite open ends of cylindrical shells and forming spaced parallel cylindrical beads in the medial regions thereof, a bed, a shell-supporting cradle on said bed, a pair of heads slidably supported on said bed an each side of said cradle and capable of being advanced from retracted positions toward the cradle in unison, a flanging die carried by each head and movable with the latter into engagement with the adjacent end of a shell positioned on the cradle, a bead expanding die assembly mounted on each head and movable with the latter into the adjacent ends of the shell, each die assembly including a plurality of radially movable dies movable into bead expanding positions in unison, a die actuating plunger slidably disposed in each head and movable relative to the head from a retracted inoperative position to an advanced, die expanding position, a supporting block adjacent each head near the side thereof remote from said cradle, a crankshaft rotatably mounted in each block, a cam secured to each shaft and rotatable therewith, said cam having a surface designed for engagement with its adjacent head for advancing tthe latter upon rotation of the cam, a connecting rod connected to each plunger, a crank arm mounted on said crankshaft for rotation therewith and connected to said connecting rod, and means for rotating said crankshafts in timed relation simultaneously to advance the heads and plungers in unison through a predetermined distance and then further advance the plungers relative to the heads, said heads in their advance acting to form flanges at opposite ends of said shell and the further advance of the plungers operating to actuate said dies and effect simultaneous expansion of the beading dies, and means operable to shift said supporting blocks toward and from the cradle to adjust the machine for operating on shells of different lengths.

4. In a machine for simultaneously flanging the opposite open ends of cylindrical shells and forming spaced parallel cylindrical beads in the medial regions thereof, a bed, a shell-supporting cradle on said bed, a pair of heads slidably supported on said bed on each side of said cradle and capable of being advanced from retracted positions toward the cradle in unison, a flanging die carried by each head and movable with the latter into engagement with the adjacent end of a shell positioned on the cradle, a bead expanding die assembly mounted on each head and movable with the latter into the adjacent ends of the shell, each die assembly including a plurality of radially movable dies movable into bead expanding positions in unison, a die actuating plunger slidably disposed in each head and movable relative to the head from a retracted, inoperative position to an advanced, die expanding position, a supporting block adjacent each head near the side thereof remote from said cradle, a crankshaft rotatably mounted in each block, a cam secured to each shaft and rotatable therewith, said cam having a surface designed for engagement with its adjacent head for advancing the latter upon rotation of the cam, a connecting rod connected to each plunger, a crank arm mounted on said crankshaft for rotation therewith and connected to said connecting rod, means for rotating said crankshafts in timed relation simultaneously to advance the heads and plungers in unison, said flanging dies engaging the ends of said shell to form flanges thereon, continued advancing movements of the plungers after the formation of said flanges serving to actuate said dies and effect simultaneous beading operations, and means for adjusting the positions of said supporting blocks relative to the cradle to vary the effective strokes of said cams and to thus vary the extent of the flanging and beading operations.

5. In a machine for simultaneously flanging the opposite open ends of cylindrical shells and forming spaced parallel cylindrical beads in the medial regions thereof, a frame including a shell support, a pair of die heads movable toward and away from said support on opposite sides thereof axially of the shell, each head having parallel sides and a central bore formed therein alined with the axis of the shell, a ring-shaped flanging die on the forward end of each head and engageable with an open end of the shell when the head is advanced, an expansible beading die mounted in the forward end of each head and movable with the latter into the adjacent end of the shell, a die actuating plunger slidably disposed in each bore for movement with and relative to the heads, a rotatable cam for advancing each head toward said support with a period of dwell at the end of the advance, shafts journaled on said frame supporting the respective cams, said flanging dies engaging the ends of the shell in such advance to form flanges thereon, means on said shafts for advancing each plunger with the associated head and then projecting it relative to the head during said dwell to expand the beading die mounted on the head, said means being operative for returning the plunger to starting position, a crosspin mounted on each plunger, there being a pair of opposed slots formed in the sides of the associated die head and into which said crosspin extends, said slots affording a clearance for the crosspins to permit free floating movement of the heads in either direction during the beading operation when said beading dies are expanded, said crosspin being adapted to engage the ends of said slots to effect a return movement of the heads during the return stroke of said plungers, and means for driving said head advancing cams and said plungers in unison.

6. In a combined flanging and beading machine of the character described, means for supporting a cylindrical shell and for restraining it against endwise movement, a die head movable toward and away from said shell axially thereof and having a bore therein alined with the axis of the shell, the forward end of said head being provided with a reduced threaded cylindrical portion, a ring-shaped flanging die threadedly received on said reduced portion and engageable with an end of the shell when said die head is advanced, an expansible beading die carried at the forward end of said die head and movable into the shell during advance of the head, actuating means for said beading die including a plunger axially slidable in said head and extending through said reduced portion, means including a rotatable cam for advancing said head toward the shell supporting means with a period of dwell at the end of the advance, said flanging die acting on the shell to form a flange thereon in the advance of said head, means for projecting said plunger forwardly of said head during said dwell period to expand the beading die, inter-engaging means on said plunger and head for effecting withdrawal of the latter during the return stroke of said plunger, and means for driving both said head advancing cam and plunger.

7. In a combined flanging and beading machine of the character described, a bed including a support for a cylindrical metal shell, a die head movable toward and away from said shell axially thereof and having a bore therein alined with the axis of the shell and provided with parallel sides each having an axially extending, elongated slot formed therein, an expansible beading die carried at the forward end of said head and movable into the shell when the head is advanced, actuating means for said beading die including a plunger axially slidable in said bore, pins projecting at opposite sides of said plunger extending into the slots provided in the sides of the head, a shaft journalled on said bed, a rotatable cam on said shaft for advancing said head toward said support with a period of dwell at the end of the advance, a connecting rod pivotally secured to said plunger, a crank arm on said shaft having its free end pivoted to said connecting rod, and means for rotating said shaft together with said crank arm and cam in unison to advance the head and project said plunger forwardly of the head to expand said beading die, said pins being adapted to engage the edges of their respective slots during the return movement of the plunger to withdraw said head.

8. In a combined flanging and beading machine of the character described, a bed including a support for a cylindrical metal shell, a die head movable toward and away from said support axially of the shell and having a bore therein alined with the axis of the shell and provided with spaced parallel sides each having a slot formed therein, a ring-shaped flange die on the forward end of said head engageable with an end of the shell on said support, means for restraining the shell against endwise movement when engaged by said die, means for adjusting the position of said flanging die axially along the head, an expansible beading die carried by the forward end of the head and movable into the shell during the advancing of the head, actuating means for said beading die including a plunger axially slidable in said bore, a crankshaft mounted on said bed for rotation about an axis, a crank arm mounted on and rotatable with said crankshaft, a connecting rod operatively connecting said crank arm and plunger whereby rotation of said crankshaft will effect reciprocation of said plunger, a cam mounted on said crankshaft and rotatable therewith and engageable with the head for advancing the latter, and a pin projecting laterally from each side of said plunger and projecting into said slots, said ring-shaped die initially engaging the end of said shell to form a flange thereon in the advance of the head, said shell thereafter serving to limit the advance of the head so that continued advance movement of the plunger will actuate said beading die, said slots providing a clearance space for the projecting ends of said pin to permit floating of the head in either direction during the beading operation as metal is drawn into the bead, said pin ends engaging the edges of said slots to withdraw said heads during the return stroke of said plunger.

References Cited in the file of this patent

UNITED STATES PATENTS

| | | |
|---|---|---|
| 846,828 | Cromwell | Mar. 12, 1907 |
| 1,013,339 | Verdin | Jan. 12, 1912 |
| 1,117,991 | Flagg | Nov. 24, 1914 |
| 1,118,590 | Sharp | Nov. 24, 1914 |
| 1,175,663 | Robinson | Mar. 14, 1916 |
| 1,500,174 | Wise | July 8, 1924 |
| 2,089,475 | Grotnes | Aug. 10, 1937 |
| 2,211,009 | Grotnes | Aug. 13, 1940 |
| 2,402,490 | Farrar | June 18, 1946 |
| 2,514,502 | Laxo | July 11, 1950 |
| 2,596,997 | Harter | May 20, 1952 |

FOREIGN PATENTS

| | | |
|---|---|---|
| 202,778 | Great Britain | Aug. 30, 1923 |